(12) United States Patent
Talarico

(10) Patent No.: US 9,737,165 B2
(45) Date of Patent: Aug. 22, 2017

(54) DEVICE FOR THE PREPARATION OF HEALTHIER TEA BAG INFUSUIONS

(71) Applicant: David Joseph Talarico, Holmdel, NJ (US)

(72) Inventor: David Joseph Talarico, Holmdel, NJ (US)

(73) Assignee: David J Talarico, Holmdel, NJ (US)

( * ) Notice: Subject to any disclaimer, the term of this patent is extended or adjusted under 35 U.S.C. 154(b) by 289 days.

(21) Appl. No.: 14/580,223

(22) Filed: Dec. 23, 2014

(65) Prior Publication Data

US 2015/0173554 A1   Jun. 25, 2015

Related U.S. Application Data

(60) Provisional application No. 61/919,818, filed on Dec. 23, 2013.

(51) Int. Cl.
*A47J 31/00* (2006.01)
*A47J 31/20* (2006.01)
*A47J 31/52* (2006.01)
*A47J 31/44* (2006.01)

(52) U.S. Cl.
CPC ............. *A47J 31/20* (2013.01); *A47J 31/002* (2013.01); *A47J 31/446* (2013.01); *A47J 31/52* (2013.01)

(58) Field of Classification Search
CPC ........ A47J 31/002; A47J 31/52; A47J 31/446; A47J 31/20
See application file for complete search history.

(56) References Cited

U.S. PATENT DOCUMENTS

| | | | | |
|---|---|---|---|---|
| 1,984,047 A | * | 12/1934 | Thieme | A47J 31/20 210/282 |
| 3,403,618 A | | 10/1968 | Lagg | |
| 4,211,156 A | * | 7/1980 | Zimmermann | A47G 19/16 206/0.5 |
| 4,844,914 A | * | 7/1989 | Bonne | B65D 85/812 206/0.5 |
| 4,875,574 A | * | 10/1989 | Travers | B65D 85/8085 206/0.5 |
| 6,431,056 B1 | * | 8/2002 | Fritschi | A47J 31/20 99/279 |

FOREIGN PATENT DOCUMENTS

| | | | |
|---|---|---|---|
| DE | 19910982 | * | 10/2000 |
| DE | 10212004311 | * | 8/2013 |
| GB | 2414927 | * | 12/2005 |

OTHER PUBLICATIONS

Lego Mindstorms NXT TeaBot Youtube video. 2009. https://www.youtube.com/watch?v=En4RWXTFK08.*
Teabot Youtube video. 2010. https://www.youtube.com/watch?v=XI-WbiyJIDQ.*
English Translation for DE19910982 published Oct. 2000.*
English Translation for DE10212004311 published Aug. 2013.*
Derwent Abstract and Figure for CN 202698651 published Jan. 2013.*

* cited by examiner

*Primary Examiner* — Anthony Weier

(57) ABSTRACT

A device for preparing tea using a tea bag which dunks the bag for a selected amount of time, then removes the bag from the tea to end the infusion process. The device allows for a more convenient way to brew healthier and more precisely made tea.

14 Claims, 5 Drawing Sheets

DEVICE FOR THE PREPARATION OF HEALTHIER TEA BAG INFUSUIONS

CROSS-REFERENCE TO RELATED APPLICATIONS

This application claims the benefit of provisional patent application Ser. No. 61/919,818, filed 2013 Dec. 23 by the present inventor.

BACKGROUND

Prior Art

The following is a tabulation of some prior art that presently appears relevant:

U.S. Patents

| U.S. Pat. No. | Kind Code | Issue Date | Patentee |
| --- | --- | --- | --- |
| 3,403,618 | B1 | 1968 Oct. 1 | Lagg |

Foreign Patent Documents

| Foreign Doc. Nr. | Cntry Code | Kind Code | Publ. Date | Applicant |
| --- | --- | --- | --- | --- |
| CN202698651 | CN | B2 | 2013 Jan. 30 | Chen |
| DE10212004311 | DE | A1 | 2013 Aug. 29 | Fritz Gross |

After water, tea is the most widely consumed beverage in the world. One very popular method of brewing tea in the western world is by the use of tea bags. Unknowingly, many people who choose this method of brewing are not getting the full health benefit of their beverage. Tea contains powerful antioxidants known as catechins which may help protect the drinker from developing cancer. However, those who do not dunk their tea bag in the hot water while it is brewing only consume a small fraction of the catechins when compared to those who do dunk the bag.

In one study published in The Journal of Agricultural and Food Chemistry in 2001, Conrad Astill and several of his colleges showed that " . . . the agitation to which the teabag is subjected is a major determinant of extraction efficiency; that is, the extraction efficiency is significantly greater for a continuously dunked teabag (dynamic infusion) than it is for a teabag that is left to float in the water, with no external agitation (static infusion)." In short, they found that "continuous mechanical dunking" of the tea bag released about four times the desirable cancer-fighting compounds (catechins) of the tea when compared to tea bags which were not continuously dunked.

The Tea-Boy Penguin Tea Timer is a device that holds the user's tea bag in the hot water for a user-defined amount of time, and then raises the tea bag out of the water once the time is up. Unfortunately, this device does not dunk the bag continuously and therefore it provides a beverage which is not a healthy as one produced by dunking.

My invention automates the dunking process, to provide tea drinkers a healthier and more convenient way to brew their beverage.

SUMMARY

In accordance with one embodiment a tea bag dunking device moves a tea bag up and down in water to create an infused beverage.

Advantages

Accordingly, advantages of one or more aspects are as follows: to produce healthier tea infusions, to produce less expensive tea bag dunkers, and to provide a more convenient way to steep tea. Other advantages of one or more aspects will be apparent from a consideration of the drawings and ensuing description.

DETAILED DESCRIPTION

Figure 1:
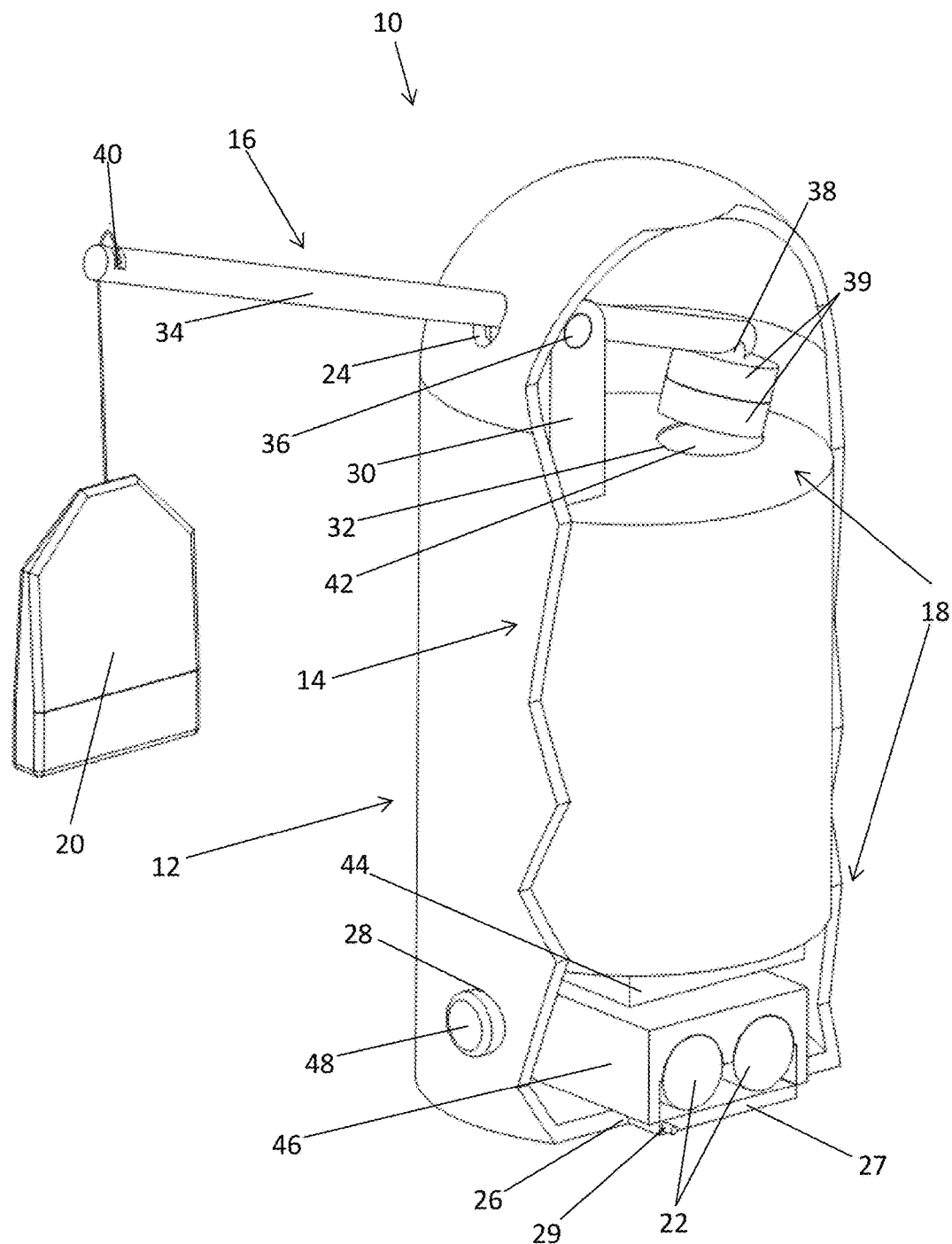
FIG. 1 is a perspective cut-away view of a tea bag dunking device.
Figure 2:
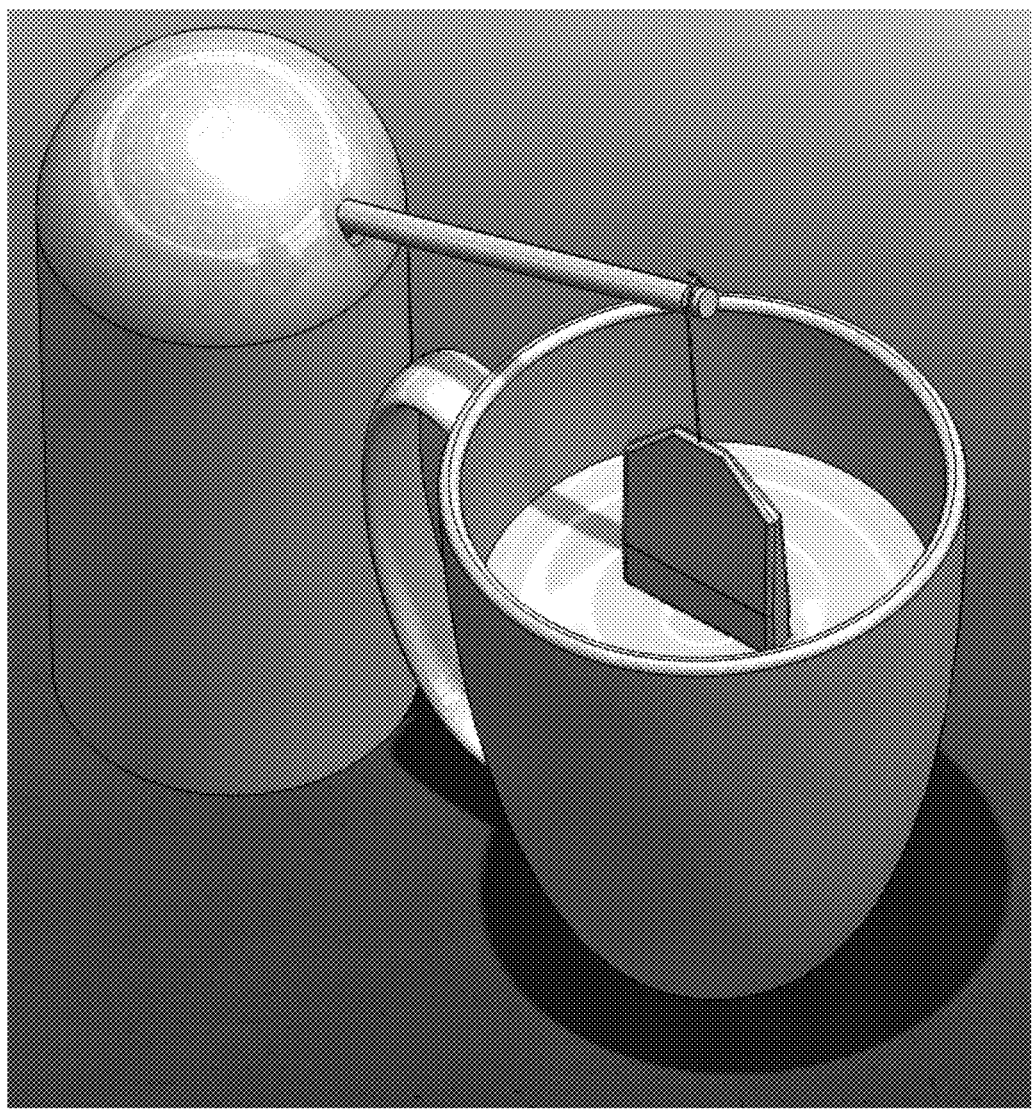
FIG. 2 is a perspective view of a tea bag dunking device in use with its dunking arm raised.
Figure 3:
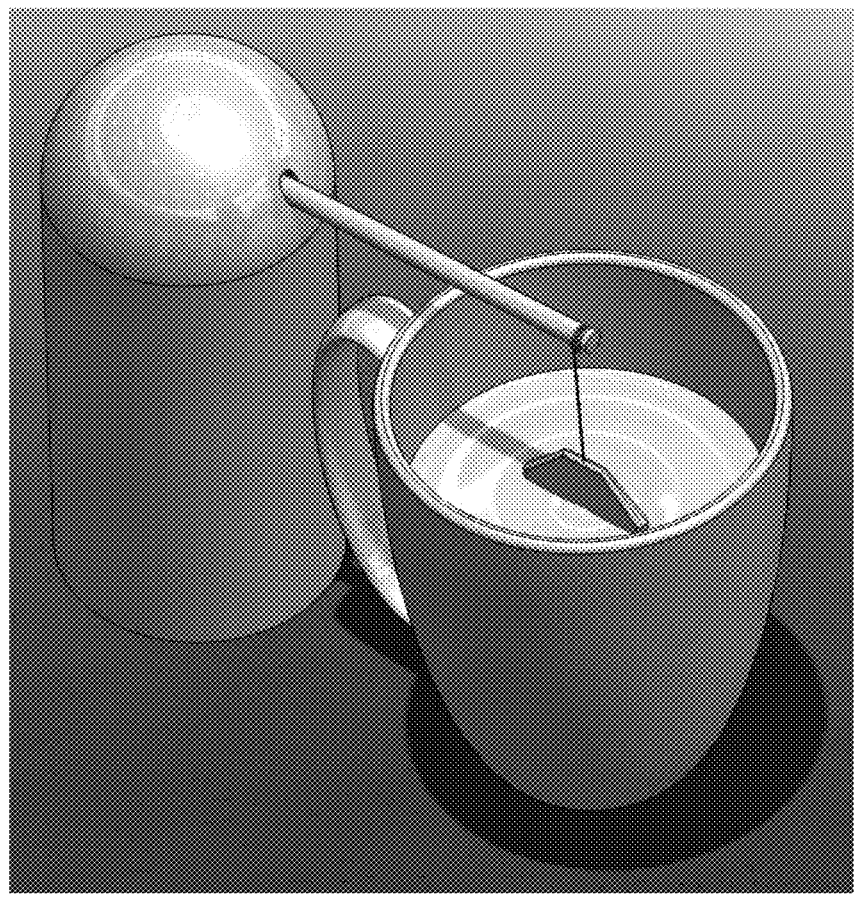
FIG. 3 is a perspective view of a tea bag dunking device in use with its dunking arm lowered.

FIGS. 1, 2 and 3—First Embodiment

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

One embodiment of a tea bag dunking device, generally designated 10, is illustrated in FIG. 1, FIG. 2, and FIG. 3. In one embodiment, device 10 comprises a housing 12, a frame 14, dunking arm 16, and dunking actuator 18. A teabag 20 is included in FIG. 1-3 for demonstrative purposes and one or more batteries 22 are included in FIG. 1 for demonstrative purposes.

All or part of housing 12 may be made of any suitably strong, water resistant material such as ABS plastic, injection-molded plastic, polyvinyl chloride (PVC), polyethylene, polypropylene, fiberglass, aluminum, steel, any other plastics, composites, metals, etc. In FIG. 1-3, the shape of housing 12 is a hemisphere on top of a cylinder. In other embodiments, the shape of housing 12 may be a rectangular prism, a truncated sphere, a truncated cone, or any other suitable shape. All or part of frame 14 may be made of any suitably strong material such as ABS plastic, injection-molded plastic, polyvinyl chloride (PVC), polyethylene, polypropylene, fiberglass, aluminum, steel, any other plastics, composites, metals, etc. All or part of dunking arm 16 may be made of any suitably strong, water resistant material such as ABS plastic, injection-molded plastic, polyvinyl chloride (PVC), polyethylene, polypropylene, fiberglass, aluminum, steel, any other plastics, composites, metals, etc.

FIG. 1 shows a cut-away view of device 10, in which a portion of housing 12 has been removed such that internal components are revealed. In one embodiment, shown in FIG. 1, housing 12 includes dunking arm opening 24, battery opening 26, and button opening 28. The positions of these openings are exemplary and they may be positioned at any suitable location on housing 12. A battery door 27 covers battery opening 26 and is rotatably mounted at one end via a battery door pivot 29. Battery door 27 may also be slidably attached to housing 12 and may use any suitable temporary attachment means to allow the user to remove and/or replace batteries 22.

In one embodiment, shown in FIG. 1, frame 14 comprises dunking arm pivot 30 and solenoid opening 32. Dunking arm pivot 30 allows dunking arm 16 to be rotatably mounted to frame 14 at a suitable location along its length. Pivot 30 may include bearings and/or bushings to reduce the wear and/or friction caused by the rotation of dunking arm 16. Pivot 30 may also include a knife edge support as an economical low friction alternative to bearings or bushings.

In one embodiment, shown in FIG. 1, dunking arm 16 comprises a long, slender shaft 34 with a shorter pivot shaft 36 that protrudes substantially horizontally in both directions at a suitable distance along shaft 34. Dunking arm 16 also comprises a magnet shaft 38, which protrudes substantially vertically downward from the end of shaft 34 which is contained within housing 12. One or more magnet(s) 39 are attached to magnet shaft 38. Dunking arm 16 further comprises a string holder 40, which allows the user to attach the string of teabag 20 in a simple, temporary fashion.

In the embodiment depicted in FIG. 1-3, string holder 40 is a simple notch which allows the user to wrap the string of teabag 20 around the notch multiple times to prevent it from slipping. String holder 40 may also be a small hole instead of a notch, a simple spring-loaded clip, a magnetic clip, or any other friction-based non-slip mechanism.

In one embodiment, shown in FIG. 1, dunking arm 16 is constrained to a suitable dunking stroke distance by the size of dunking arm opening 24 in housing 12, but it will be appreciated that dunking arm 16 may be constrained in a number of ways. Examples include interference with magnet shaft 38, one or more small wire(s) or string(s) attached to magnet shaft 38, etc. A damping material (not shown) such as felt or foam rubber may be attached to dunking arm 16 at one or more locations that may contact other parts of dunking device 10 so as to reduce the noise of the operation and/or the wear of one or more components of dunking device 10.

In one embodiment, shown in FIG. 1, dunking actuator 18 comprises a solenoid 42, a circuit board 44, a battery holder 46, and a button 48. Dunking actuator 18 is the electrical, mechanical, or electro-mechanical means by which device 10 moves dunking arm 16 to provide the desired dunking motion. In the embodiment depicted in FIG. 1, dunking actuator 18 simply activates solenoid 42 intermittently to apply a magnetic force to magnet(s) 39. It is important with this design to choose the weight of magnet(s) 39 and the position of pivot shaft 36 such that teabag 20 (when wet) remains in the up position (as depicted in FIG. 1 and FIG. 2) when solenoid 42 is inactive.

A simple electric circuit (not shown) on circuit board 44 may be employed which sends electric pulses to solenoid 42 of suitable duration and at suitably chosen intervals. The pulses create a magnetic field around solenoid 42, which is oriented with respect to the field generated by magnet(s) 39 such that solenoid 42 repels magnet(s) 39, thereby causing dunking arm 16 to rotate about dunking arm pivot 30, producing the desired dunking motion. The duration of the pulses, along with the strength of magnet(s) 39, and the choice of solenoid 42 must produce a force of sufficient strength to lower teabag 20 a suitable amount when activated while still minimizing electrical consumption so as to prolong battery life. The pulses are sent to solenoid 42 for an amount of time specified by the user.

Battery holder 46 holds the batteries 22 which provide electrical power to solenoid 42 and the circuit on circuit board 44. Additionally or alternatively, known USB technology may be employed to supply electrical power to solenoid 42 and the circuit on circuit board 44 from a nearby USB-compatible power source (e.g. computer, laptop, external battery, USB wall outlet adapter, etc.). Button 48 allows for the user to activate the circuit on circuit board 44.

Dunking actuator 18 may also comprise a continuously rotating electric or spring-driven motor (not shown), coupled to the input link (crank) of one of the following an oscillatory mechanism (not shown): a cam and follower, a crank rocker, a crank slider, a crank shaper etc. It may also consist of an intermittently activated electric or spring-driven motor coupled directly to pivot shaft 36. It may also utilize a suitable gearbox to provide a reduction in shaft speed.

In one embodiment, dunking actuator 18 employs known audio technology to alert the user when their beverage has finished brewing.

Figure 4:
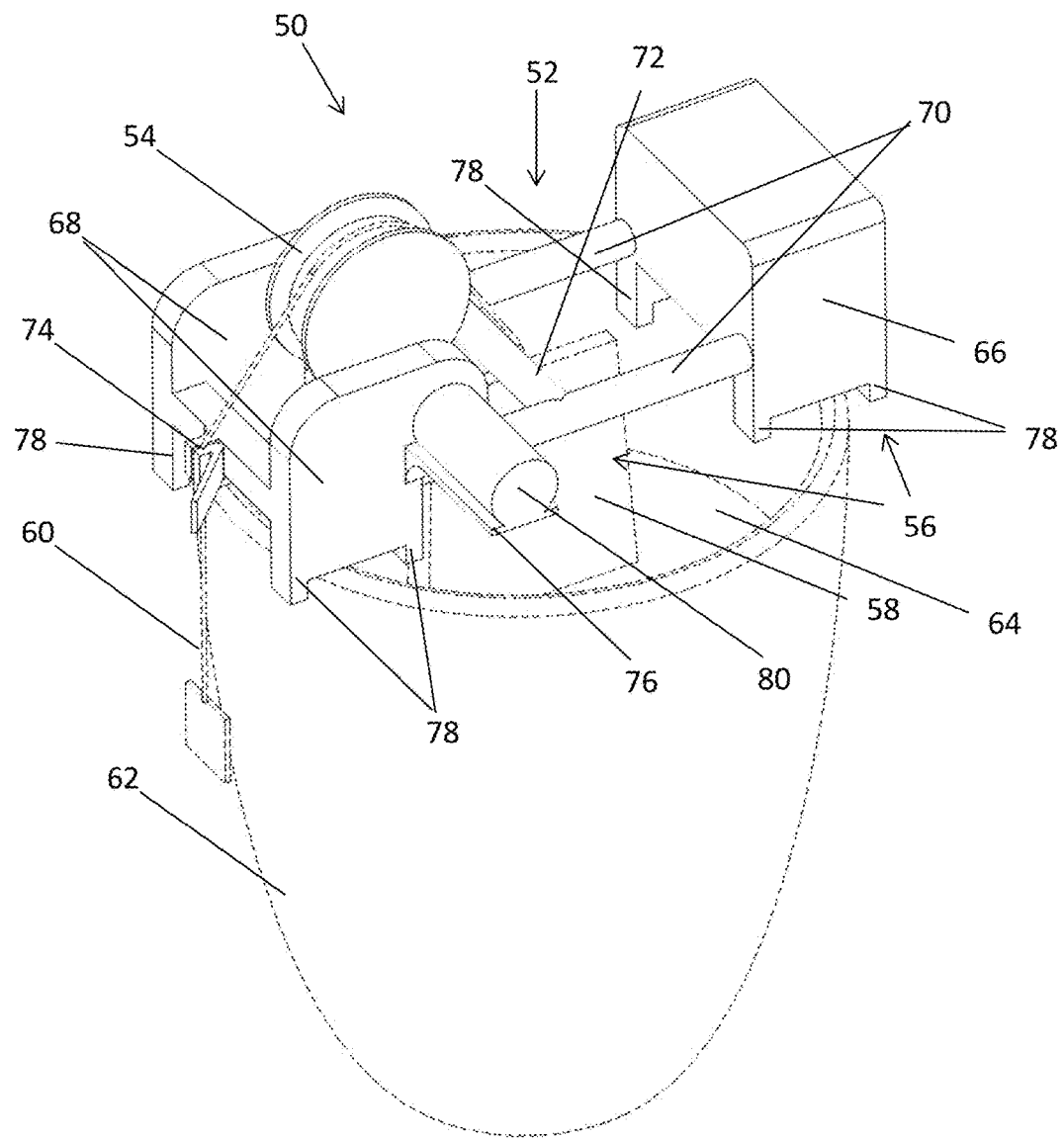
FIG. 4 is a perspective view of a tea bag dunking device with its pulley in the up position.

FIG. 4—Alternative Embodiment

Figure 5:
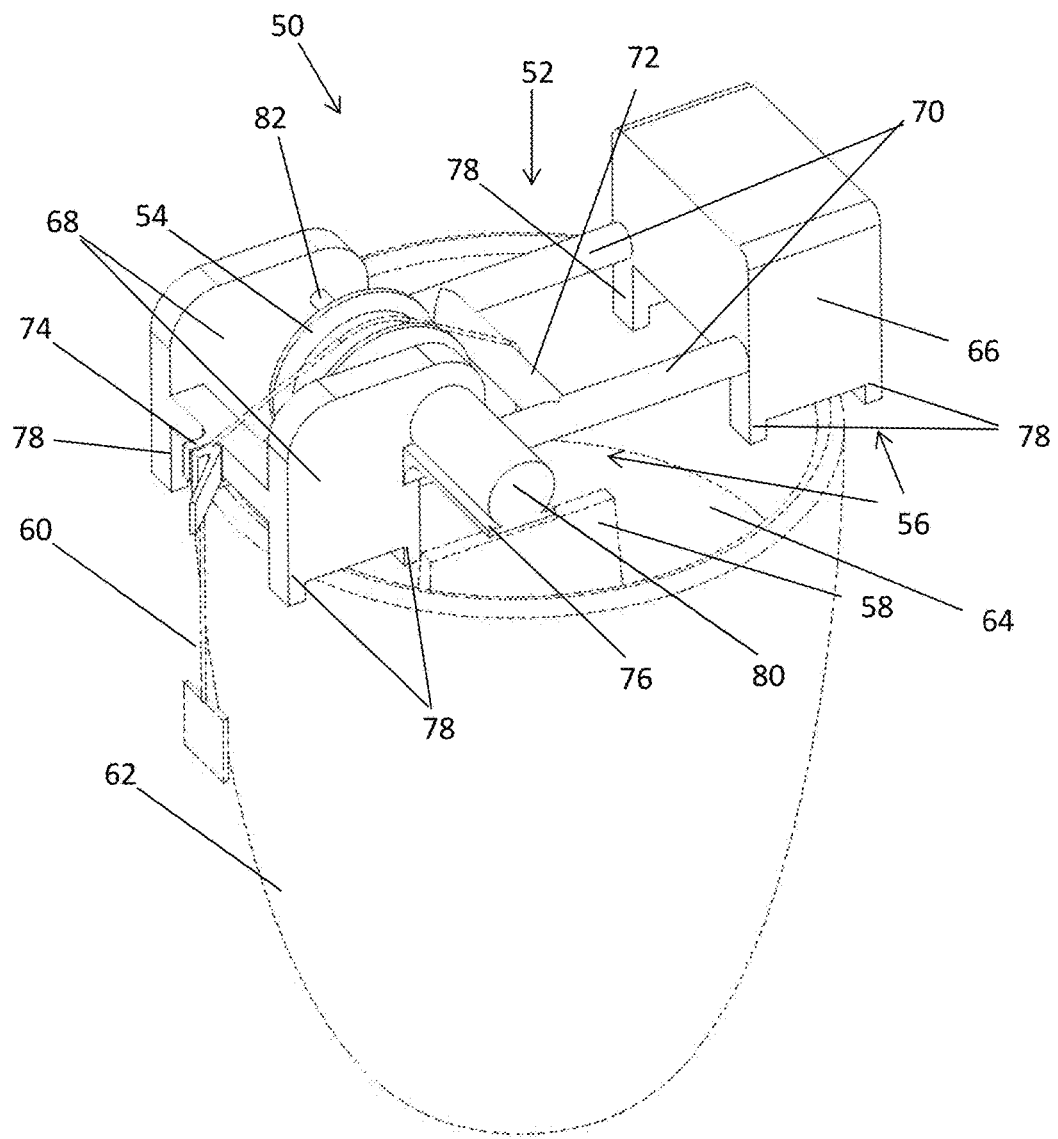
FIG. 5 is a perspective view of a tea bag dunking device with its pulley in the down position.

One embodiment of a tea bag dunking device, generally designated 50, is illustrated in FIG. 4 and FIG. 5. In one embodiment, device 50 comprises a frame 52, a dunking pulley 54, and a dunking actuator 56. A teabag 58, a teabag string 60, a mug 62, and a quantity of water 64 are shown in dashed lines in FIG. 4 and FIG. 5 for demonstrative purposes. FIG. 4 shows pulley 54 in the up position (with teabag 58 raised and substantially out of water 64), and FIG. 5 shows pulley 54 in the down position (with teabag 58 lowered a suitable amount into water 64).

In one embodiment, shown in FIG. 4 and FIG. 5, frame 52 rests on the rim of mug 62. In other embodiments (not shown), frame 52 is temporarily mounted onto the rim of mug 62 by any easily removable mechanical means such as a spring loaded clip (not shown), a rubber gripper (not shown), a magnetic clip, etc. In still other embodiments, frame 52 is free-standing next to mug 62. In still other embodiments, mug 62 is designed specifically for temporary attachment to frame 52, employing any suitable mechanical, magnetic, or other means to temporarily secure frame 52 to mug 62.

All or part of frame 52 may be made of any suitably strong material such as ABS plastic, injection-molded plastic, polyvinyl chloride (PVC), polyethylene, polypropylene, fiberglass, aluminum, steel, any other plastics, composites, metals, etc. All or part of dunking pulley 54 may be made of any suitably strong, water resistant material such as ABS plastic, injection-molded plastic, polyvinyl chloride (PVC), polyethylene, polypropylene, fiberglass, aluminum, steel, any other plastics, composites, metals, etc.

In one embodiment, shown in FIG. 4 and FIG. 5, frame 52 comprises a battery housing 66 on one end, and one or more dunking pulley supports 68 on an opposing end. Housing 66 and supports 68 are connected by one or more spanning members 70 which span the center of the opening of mug 62. In one embodiment, shown in FIG. 4 and FIG. 5, spanning members 70 are connected by a cross member 72, which guides teabag string 60 such that the dunking motion of teabag 58 is substantially linear. Frame 52 further comprises a string holder 74, a motor mount 76, and one or more frame retainer(s) 78.

The location of housing 66 in FIG. 4 and FIG. 5 is exemplary, and it should be understood that housing 66 may be attached to frame 52 at any suitable location, so long as the location is allows for stable operation (i.e. in the case of frame 52 being supported by mug 62, it does not tip over mug 62 or device 50).

The opening created by housing 66, spanning members 70, and cross member 72 should be large enough for substantially large teabags to be easily dropped through.

In one embodiment, members 70 are of a fixed length. In other embodiments, spanning members 70 are telescopic, such that frame 52 may be adjusted to fit a range of mug sizes. In still other embodiments, spanning members 70 are telescopic and spring loaded in order to apply a lateral (inward or outward) retaining force to retainer(s) 78.

In one embodiment, cross member 72 is unitarily molded to members 70. However, it should be understood that cross member 72 may be connected using any mechanical fastening means, adhesive bonding, any type of welding, etc.

String holder 74 is located near the end of frame 52 adjacent to supports 68 on the side of pulley 54 opposite of teabag 58. In the embodiment depicted in FIG. 4 and FIG. 5, string holder 74 is a finger-actuated spring-loaded clip. In other embodiments, holder 74 is a simple notch (not shown) which allows the user to wrap the string of teabag 58 around the notch multiple times to prevent it from slipping. In still other embodiments, string holder 74 may also be a small hole (not shown) instead of a notch, a magnetic clip (not shown), or any other friction-based non-slip mechanism (not shown).

Motor mount 76 is attached at a suitable location to supports 68 by any suitable means.

In one embodiment, frame retainers 78 comprise small protrusions from the undersides of supports 68 and housing 66, which prevents frame 52 from slipping off of mug 62. The locations of retainers 78 are exemplary, and it should be understood that any suitable location may be chosen such that frame 52 does not slip off of mug 62. In one embodiment, frame retainer(s) comprise concentric arc segments and/or concentric circles.

In one embodiment, one or more rubber pad(s) (not shown) are bonded to the underside of supports 68 and/or housing 66 to prevent frame 52 from sliding on the rim of mug 62.

Dunking actuator 56 comprises a motor 80, a shaft 82 (shown in FIG. 5), an energy storage means (not shown), and an electric circuit (not shown). In one embodiment, shown in FIG. 4 and FIG. 5, motor 80 is an electric gear motor mounted to motor mount 76. Motor 80 may also be a spring driven gear motor (not shown) where the energy storage means comprises the spring (not shown). Motor 80 is directly coupled to shaft 82 and must rotate at a sufficient speed to effectively infuse the beverage, but not so fast as to waste energy unnecessarily, splash any of water 64 out of mug 62 or onto device 50, or to produce more noise than necessary.

The energy storage means (not shown) may comprise one or more rechargeable and/or disposable batteries, it may comprise a spring, it may comprise an elevated mass (the mass may even be mug 62 itself!), it may comprise one or more solar panels, it may comprise a butane-powered fuel cell, etc. Additionally or alternatively, actuator 56 may receive electrical energy from an external source, such as a nearby wall outlet or laptop.

The electric circuit (not shown) receives a user input (not shown) (via a button, switch, wireless signal, etc.) to begin the infusion process. It activates motor 80 indefinitely or for a certain amount of time. This amount of time may be fixed or user-selectable by way of a second user input (not shown) (examples comprise a button, a dial, a sliding switch, a wireless signal, etc.). The circuit may use any suitable visual (LED light, incandescent light, digital display, etc.) and/or audible (speaker, buzzer, etc.) and/or wireless (Wi-Fi, Bluetooth, etc.) means to confirm certain inputs and states of device 50 as well as to notify the user when the infusion process has concluded. In one embodiment, the circuit employs known technology to limit the amount of time that motor 80 is activated.

In one embodiment, the circuit uses a sensor (such as a proximity sensor, an infrared sensor and emitter, etc.) which indicates the rotational position of shaft 82. In one embodiment, this sensor is used in conjunction with a simple counter IC chip in order to shut off motor 80 with pulley 54 in the up position when a number of revolutions corresponding to the desired amount of steeping time have been reached. In this case, the sensor may also be attached to the high speed shaft within gear motor 80 or to the low speed output shaft 82. In another embodiment, this sensor is used in conjunction with an IC timer so that once the timer indicates that the time is up, the motor can continue to turn until the sensor indicates that pulley 54 is in the up position.

Dunking pulley 54 is rigidly attached to shaft 82 such that shaft 82 is parallel to the axis of pulley 54, but not concentric. Instead, pulley 54 is eccentric with respect to shaft 82, thus shaft 82 is attached to pulley 54 at a location near the periphery of pulley 54. This allows for pulley 54 to pull and release teabag string 60 repeatedly as shaft 82 rotates about its axis. String 60 slides on pulley 54, and as it is pulled and released, teabag 58 moves up and down, respectively. Pulley 54 may be made of any suitable low-friction material, or it may employ a low friction coating, to both reduce the wear on string 60, and to provide a smooth and efficient dunking motion. In FIG. 4 and FIG. 5, pulley 54 is round, but should be understood that any suitable shape may be used. In one embodiment, pulley 54 has a cam contour to improve the motion characteristics of teabag 58.

Operation—FIG. 1-3

In one embodiment, shown in FIGS. 2 and 3, the user simply inserts the string of their tea bag into string holder 40 then presses button 48 a number of times corresponding to the number of minutes for which he or she would like to brew his or her beverage, and dunking actuator 18 begins dunking the bag automatically. Once the desired time is up, solenoid 42 remains inactive and dunking arm 16 remains in the up position due to the weight of magnet(s) 39, thereby ending the brewing process.

Operation—FIG. 4-5

In one embodiment, shown in FIGS. 4 and 5, the user simply places device 50 onto their tea cup or mug, drops their tea bag in the middle of frame 52, inserts string 60 into string holder 74 such that teabag 58 is just above the surface of water 64, and uses the user input(s) of the circuit to specify the duration of steeping and then to begin the infusion process. Once the desired time is up, motor 80 is shut off automatically by the circuit or by user input with pulley 54 in the up position, thereby ending the infusion process.

In another embodiment, a dunking actuator uses a spring motor, a suitable mechanical means, and a dial timer to carry out the same function (not shown). Instead of pressing a button, the user would turn the dial to the desired brewing time and the dunking actuator would begin dunking the bag for the selected amount of time automatically. A bell (not shown) may be struck to alert the user when their beverage has finished brewing, and a mechanical stop would index pulley 54 into the up position.

Operation—Other Embodiments

In one embodiment, a pair of buttons and simple LCD display allow the user to press a first button a number of times corresponding to the number of minutes he or she would like to brew their beverage for, then press a second start button, and a dunking actuator would begin dunking the bag for the selected amount of time automatically, while displaying the time remaining on the LCD display (not shown).

In another embodiment, a dunking actuator uses a spring motor, a suitable mechanical means, and a dial timer to carry out the same function (not shown). Instead of pressing a button, the user would turn the dial to the desired brewing time and the dunking actuator would begin dunking the bag for the selected amount of time automatically. A bell (not shown) may be struck to alert the user when their beverage has finished brewing.

I claim:

1. A device for the preparation of an infusion beverage, comprising:
   a dunking arm comprising a magnet which moves a porous vessel comprising a teabag, containing a portion of infusing substance, into and out of a hot liquid; and
   a dunking actuator comprising an electric circuit and a solenoid which is adjacent to the magnet, such that the circuit can activate the solenoid intermittently to actuate the dunking arm for a certain amount of time, then deactivate the dunking arm with the vessel out of the hot liquid to end infusion process.

2. The dunking actuator of claim 1 comprising a rechargeable battery.

3. The dunking actuator of claim 1 comprising a solar panel.

4. The dunking actuator of claim 1 comprising an elevated mass energy storage system.

5. The dunking actuator of claim 1 comprising a spring energy storage system.

6. The device of claim 1 further comprising: telescopic spanning members which allow the device to adjust to different size beverage containers.

7. The device of claim 1 further comprising: spring loaded telescopic spanning members which allow the device to adjust to different size beverage containers and to secure itself to the container.

8. A device for the preparation of an infusion beverage, comprising:
   an eccentrically mounted dunking pulley and a string gripper, wherein a string that is attached at a first end to vessel comprising a teabag, containing a portion of an infusing substance, slidably rests on the periphery of the pulley and is temporarily attached at a point further along its length to the gripper, such that as the pulley rotates eccentrically, it pulls the vessel by the string into and out of the hot liquid; and
   a dunking actuator which activates the dunking pulley for a certain amount of time, then deactivates the dunking pulley with the vessel out of the hot liquid to end an infusion process.

9. A device for the preparation of an infusion beverage, comprising:
   an eccentrically mounted dunking pulley, a string gripper, and a cross member fixed to the device near the middle of the opening of a beverage container, wherein a string, which is attached at a first end to vessel comprising a teabag, containing a portion of an infusing substance, is slidably routed over the cross member, then over the periphery of the pulley, and is temporarily attached at a point further along its length to the gripper, such that as the pulley rotates eccentrically, it pulls the vessel by the string into and out of the hot liquid, with the cross member guiding the string to make the motion of the vessel substantially linear; and
   a dunking actuator which activates the dunking pulley for a certain amount of time, then deactivates the dunking pulley with the vessel out of the hot liquid to end an infusion process.

10. The dunking actuator of claim 1 comprising: a spring-driven motor.

11. The device of claim 8 further comprising: telescopic spanning members which allow the device to adjust to different size beverage containers.

12. The device of claim 8 further comprising: spring loaded telescopic spanning members which allow the device to adjust to different size beverage containers and to secure itself to the container.

13. The device of claim 9 further comprising: telescopic spanning members which allow the device to adjust to different size beverage containers.

14. The device of claim 9 further comprising: spring loaded telescopic spanning members which allow the device to adjust to different size beverage containers and to secure itself to the container.

* * * * *